(12) United States Patent
Hu et al.

(10) Patent No.: US 12,413,487 B2
(45) Date of Patent: Sep. 9, 2025

(54) METHOD AND APPARATUS FOR PREVENTING NETWORK ATTACKS IN A NETWORK SLICE

(71) Applicant: NOKIA TECHNOLOGIES OY, Espoo (FI)

(72) Inventors: Zhiyuan Hu, Shanghai (CN); Jing Ping, Sichuan (CN); Iris Adam, Munich (DE); Zhigang Luo, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 114 days.

(21) Appl. No.: 17/923,722

(22) PCT Filed: May 6, 2020

(86) PCT No.: PCT/CN2020/088792
§ 371 (c)(1),
(2) Date: Nov. 7, 2022

(87) PCT Pub. No.: WO2021/223103
PCT Pub. Date: Nov. 11, 2021

(65) Prior Publication Data
US 2023/0179638 A1    Jun. 8, 2023

(51) Int. Cl.
*H04L 9/40*    (2022.01)
*H04L 41/40*    (2022.01)
(Continued)

(52) U.S. Cl.
CPC .......... *H04L 41/5051* (2013.01); *H04L 41/40* (2022.05); *H04L 63/0209* (2013.01);
(Continued)

(58) Field of Classification Search
None
See application file for complete search history.

(56) References Cited

U.S. PATENT DOCUMENTS

| | | | |
|---|---|---|---|
| 11,269,673 B2 * | 3/2022 | Miller | H04L 63/00 |
| 11,671,335 B2 * | 6/2023 | Narendra | H04W 4/70 |
| | | | 370/229 |

(Continued)

FOREIGN PATENT DOCUMENTS

| | | | | |
|---|---|---|---|---|
| CN | 106790294 A | | 5/2017 | |
| CN | 108337110 A | * | 7/2018 | H04L 41/00 |

(Continued)

OTHER PUBLICATIONS

Wei Yang and Carol Fung (A Survey on Security in Network Functions Virtualization); pp. 5; IEEE (Year: 2016).*

(Continued)

*Primary Examiner* — Ali H. Cheema
(74) *Attorney, Agent, or Firm* — Barta Jones, PLLC

(57) ABSTRACT

Provided herein are systems and methods for preventing network attacks in a network slice. In particular, security requirements of a network slice instance are retrieved and specific security policies to be applied to each of multiple constituent network slice subnet instances within the network slice instance are identified based on the security requirements. A deployment of one or more security function instances for each subnet instance configured according to a corresponding security policy is then facilitated.

21 Claims, 7 Drawing Sheets

(51) Int. Cl.
*H04L 41/5051* (2022.01)
*H04L 41/0894* (2022.01)
*H04L 41/0895* (2022.01)
*H04L 41/0897* (2022.01)

(52) U.S. Cl.
CPC ........ *H04L 63/205* (2013.01); *H04L 41/0894* (2022.05); *H04L 41/0895* (2022.05); *H04L 41/0897* (2022.05); *H04L 63/0263* (2013.01); *H04L 63/20* (2013.01)

(56) References Cited

U.S. PATENT DOCUMENTS

| | | | | |
|---|---|---|---|---|
| 2016/0112337 | A1* | 4/2016 | Zhang | H04L 47/35 370/237 |
| 2016/0182684 | A1* | 6/2016 | Connor | G06F 9/45558 709/203 |
| 2017/0250925 | A1* | 8/2017 | Suzuki | H04L 43/0882 |
| 2018/0063018 | A1* | 3/2018 | Bosch | H04L 47/822 |
| 2018/0316564 | A1* | 11/2018 | Senarath | H04L 41/5051 |
| 2019/0021010 | A1* | 1/2019 | Senarath | H04W 16/10 |
| 2019/0140904 | A1* | 5/2019 | Huang | H04L 41/0894 |
| 2019/0150017 | A1* | 5/2019 | Yao | H04W 16/02 370/252 |
| 2019/0166001 | A1* | 5/2019 | Ma | H04L 41/122 |
| 2019/0174536 | A1* | 6/2019 | Han | H04W 74/002 |
| 2019/0223055 | A1* | 7/2019 | Bor Yaliniz | H04L 41/0896 |
| 2019/0260690 | A1* | 8/2019 | Sun | H04L 41/0895 |
| 2019/0268213 | A1* | 8/2019 | Zhou | H04L 41/0246 |
| 2019/0319845 | A1* | 10/2019 | Zhu | H04L 47/2425 |
| 2019/0386878 | A1* | 12/2019 | Chou | H04W 48/18 |
| 2019/0386894 | A1* | 12/2019 | Hu | H04L 41/50 |
| 2020/0015102 | A1* | 1/2020 | Sun | H04L 41/0897 |
| 2020/0021487 | A1* | 1/2020 | Yao | H04L 41/02 |
| 2020/0045063 | A1* | 2/2020 | Zhang | H04L 63/1416 |
| 2020/0052969 | A1* | 2/2020 | Xu | H04L 41/122 |
| 2020/0059407 | A1* | 2/2020 | Lu | H04L 41/0896 |
| 2020/0154292 | A1* | 5/2020 | Bor-Yaliniz | H04L 41/40 |
| 2020/0220900 | A1* | 7/2020 | Banerjee | H04L 43/067 |
| 2020/0228990 | A1* | 7/2020 | Xu | H04L 41/5054 |
| 2020/0313969 | A1* | 10/2020 | Li | H04L 41/0893 |
| 2020/0382386 | A1* | 12/2020 | Narendra | H04W 4/70 |
| 2020/0412612 | A1* | 12/2020 | Cherunni | H04L 43/20 |
| 2021/0099335 | A1* | 4/2021 | Li | H04L 41/0627 |
| 2021/0160131 | A1* | 5/2021 | Maguire | H04L 41/0806 |
| 2021/0185695 | A1* | 6/2021 | Gupta | H04W 28/16 |
| 2021/0212010 | A1* | 7/2021 | Lee | H04W 48/18 |
| 2021/0250814 | A1* | 8/2021 | Poe | H04W 28/0236 |
| 2021/0258217 | A1* | 8/2021 | Chen | H04L 67/34 |
| 2021/0306842 | A1* | 9/2021 | Rivas Molina | H04W 4/70 |
| 2022/0255864 | A1* | 8/2022 | Wang | H04L 47/828 |
| 2022/0295353 | A1* | 9/2022 | Gautam | H04W 28/26 |
| 2022/0394596 | A1* | 12/2022 | Casati | H04W 48/06 |
| 2023/0045460 | A1* | 2/2023 | Ho | H04L 41/0806 |
| 2023/0269305 | A1* | 8/2023 | Mestery | G06F 9/46 709/217 |
| 2023/0284127 | A1* | 9/2023 | Gautam | H04L 41/5048 370/328 |

FOREIGN PATENT DOCUMENTS

| | | | | |
|---|---|---|---|---|
| CN | 108632848 | A | | 10/2018 |
| CN | 108809671 | A | | 11/2018 |
| CN | 109121185 | A | | 1/2019 |
| CN | 109547232 | A | | 3/2019 |
| CN | 109768875 | A | * | 5/2019 |
| CN | 109802850 | A | | 5/2019 |
| CN | 110167024 | A | * | 8/2019 ............ H04W 12/06 |
| CN | 110401946 | A | | 11/2019 |
| CN | 110476453 | A | * | 11/2019 ......... H04L 41/0893 |
| CN | 113132132 | A | * | 7/2021 ............. H04L 41/00 |
| CN | 109218046 | B | * | 9/2021 ............. H04L 41/04 |
| EP | 3 609 129 | A1 | | 2/2020 |
| KR | 20200059474 | A | * | 5/2020 |
| WO | WO-2018089634 | A1 | * | 5/2018 |
| WO | WO-2018121453 | A1 | * | 7/2018 ............. H04L 41/06 |
| WO | WO-2019184801 | A1 | * | 10/2019 ............ H04W 24/02 |
| WO | WO-2019196796 | A1 | * | 10/2019 ......... H04L 41/0893 |
| WO | WO-2020182289 | A1 | * | 9/2020 |

OTHER PUBLICATIONS

Nayeem Khan and Tariq Ahmad War (A Deep Study on Security Vulnerabilities in Virtualization at Cloud Computing); pp. 5; vol. 173-No. 1, Sep. (Year: 2017).*

International Search Report and Written Opinion corresponding to International Patent Appln. No. PCT/CN2020/088792, dated Jan. 28, 2021.

Office Action received for corresponding Chinese Patent Application No. 202080102713.2, dated Aug. 30, 2024, 8 pages of Office Action and no page of translation available.

Extended European Search Report received for corresponding European Patent Application No. 20934308.6, dated Dec. 19, 2023, 8 pages.

"3rd Generation Partnership Project; Technical Specification Group Services and System Aspects; Management and orchestration; Provisioning; (Release 16)", 3GPP TS 28.531, V16.5.0, Mar. 2020, pp. 1-71.

Office Action received for corresponding Chinese Patent Application No. 202080102713.2, dated Mar. 28, 2024, 11 pages of Office Action and no page of translation available.

* cited by examiner

METHOD AND APPARATUS FOR PREVENTING NETWORK ATTACKS IN A NETWORK SLICE

FIELD OF THE INVENTION

Embodiments of the disclosure generally relate to security technology relating to network slices, and more particularly, to methods and apparatus for preventing network attacks in a network slice.

BACKGROUND

One concept used in Next Generation (or 5G) mobile networks is the concept of network slicing. With network slicing, an operator may deploy multiple network slice instances delivering different features for different groups of UEs, e.g. as they deliver a different committed service, and/or because they may be dedicated to a customer, an enterprise or a vertical industry. These groups of UEs can enjoy connectivity and data processing of mobile networks tailored to their specific requirements (e.g., data speed, quality, latency, reliability, security, pricing model, etc.), that adhere to a Service Level Agreement (SLA) agreed with their associated services, customers, enterprises or vertical industries. That means mobile networks (e.g., AN (Access Network), CN (Core Network)) could be shared by multiple parties, such as multiple services, customers, enterprises, or industry verticals.

The introduction of network slicing in such networks and systems brings new technical issues requiring new solutions. An example of such new technical issues is to provide secure inter-network slice and intra-network slice communication, as well as the prevention of attacks at the edge of network slices. For example, it is a major requirement for mobile network operators (MNOs) or industry verticals to provide a secure Internet access.

This disclosure shows a solution for preventing network attacks in a network slice.

SUMMARY

This summary is not intended to identify key features or essential features of the claimed subject matter, nor is it intended to be used to limit the scope of the claimed subject matter.

According to a first aspect of the disclosure, it is provided a method. Said method comprises obtaining security requirements of a network slice instance; determining respective security policy to be applied to each of a plurality of constituent network slice subnet instances of the network slice instance based on the security requirements of the network slice instance; and causing each of the plurality of constituent network slice subnet instances to be provided with one or more security function instances configured according to respective determined security policy. The method can be performed in a network slice layer.

In an embodiment, the method can further comprise breaking down the security requirements of the network slice instance into separate security requirements corresponding to each of the plurality of constituent network slice subnet instances. The respective security policy can be determined by deriving the respective security policy based on the separate security requirements corresponding to each of the plurality of constituent network slice subnet instances.

In an embodiment, the method may further comprise receiving a request for allocating the network slice instance for a service; determining security requirements of the service; and determining the security requirements of the network slice instance according to the security requirements of the service. The method may further comprise selecting a network slice network resource module for the network slice instance based on the security requirements of the network slice instance. The network slice network resource module defines a plurality of constituent network slice subnets of the network slice instance. The method may further comprise sending corresponding requests to allocate the plurality of constituent network slice subnet instances for the network slice instance. Each of the corresponding requests can contain respective security policy of a constituent network slice subnet instance.

In an embodiment, the method may further comprise receiving a report or an alarm indicative of a security incident in one of the plurality of constituent network slice subnet instances; updating a security policy of at least one network slice subnet instance of the plurality of constituent network slice subnet instances, based on the security incident; and causing the at least one network slice subnet instance to be updated, so as to be provided with a new security function instance or a reconfigured existing security function instance according to the updated security policy.

In an embodiment, the one or more security function instances may comprise a security function instance which is to be deployed at an edge of respective network slice subnet instance.

In an embodiment, the method may further comprise sending a request to create a security network slice subnet instance at the edge of the network slice instance, wherein the request contains a security policy determined according to the security requirements of the network slice instance.

In an embodiment, the one or more security function instances may comprise a firewall.

According to a second aspect of the disclosure, it is provided a method. Said method comprises receiving a request to allocate a constituent network slice subnet instance for a network slice instance, wherein the request contains a security policy to be applied the constituent network slice subnet instance; and causing the constituent network slice subnet instance to be provided with one or more security function instances configured according to the security policy. The security policy is determined based on security requirements of the network slice instance. The method can be performed in a network slice subnet layer.

In an embodiment, the method can further comprise checking whether the security policy is consistent with or conflict with a security policy of another network slice instance which is sharing the constituent network slice subnet instance. The method can further comprise checking whether the security policy is consistent with or conflict with a security policy applied to another constituent network slice subnet instance of the same network slice instance.

In an embodiment, the method can further comprise selecting a network slice subnet network resource module for the constituent network slice subnet instance based on the security policy. The network slice subnet network resource module defines one or more security functions.

In an embodiment, the method can further comprise monitoring the security function instance during an operation of the network slice instance; determining performance or capacity change of the security function instance; and scaling out or scaling in capacities of the security function instance according to the performance or capacity change.

In an embodiment, the method can further comprise collecting security relevant data of the constituent network slice subnet instance during an operation of the network slice instance; determining a security incident based on an analysis on the security relevant data; and determine a new security policy from the security incident, so as to configure the security function instance and/or to create a new security function instance according to the new security policy. The method can further comprise sending a report or an alarm indicative of the security incident to a network slice layer.

In an embodiment, the request can be a request to update the constituent network slice subnet instance. The response can contain an updated security policy to be applied the constituent network slice subnet instance.

In an embodiment, the one or more security function instance comprise a security function instance which is to be deployed at an edge of respective network slice subnet instance. The one or more security function instances can comprise a firewall.

According to third aspect of the disclosure, it is provided an apparatus. Said apparatus may comprise at least one processor, at least one memory including computer program code, the memory and the computer program code configured to, working with the at least one processor, cause the apparatus to obtain security requirements of a network slice instance; determine respective security policy to be applied to each of a plurality of constituent network slice subnet instances of the network slice instance, based on the security requirements of the network slice instance; and cause each of the plurality of constituent network slice subnet instances to be provided with one or more security function instances configured according to respective determined security policy.

According to fourth aspect of the disclosure, it is provided an apparatus. Said apparatus may comprise at least one processor, at least one memory including computer program code, the memory and the computer program code configured to, working with the at least one processor, cause the apparatus to receive a request to allocate a constituent network slice subnet instance for a network slice instance, wherein the request contains a security policy to be applied the constituent network slice subnet instance; and cause the constituent network slice subnet instance to be provided with one or more security function instances configured according to the security policy. The security policy is determined based on security requirements of the network slice instance.

According to fifth aspect of the present disclosure, it is provided a computer readable storage medium, on which instructions are stored, when executed by at least one processor, the instructions cause the at least one processor to perform the methods according to the first and/or second aspects.

According to sixth aspect of the present disclosure, it is provided computer program product comprising instructions which when executed by at least one processor, cause the at least one processor to perform the methods according to the first and/or second aspects.

These and other objects, features and advantages of the disclosure will become apparent from the following detailed description of illustrative embodiments thereof, which is to be read in connection with the accompanying drawings.

BRIEF DESCRIPTION OF THE DRAWINGS

Some example embodiments will now be described with reference to the accompanying drawings in which.

DETAILED DESCRIPTION

Figure 1:
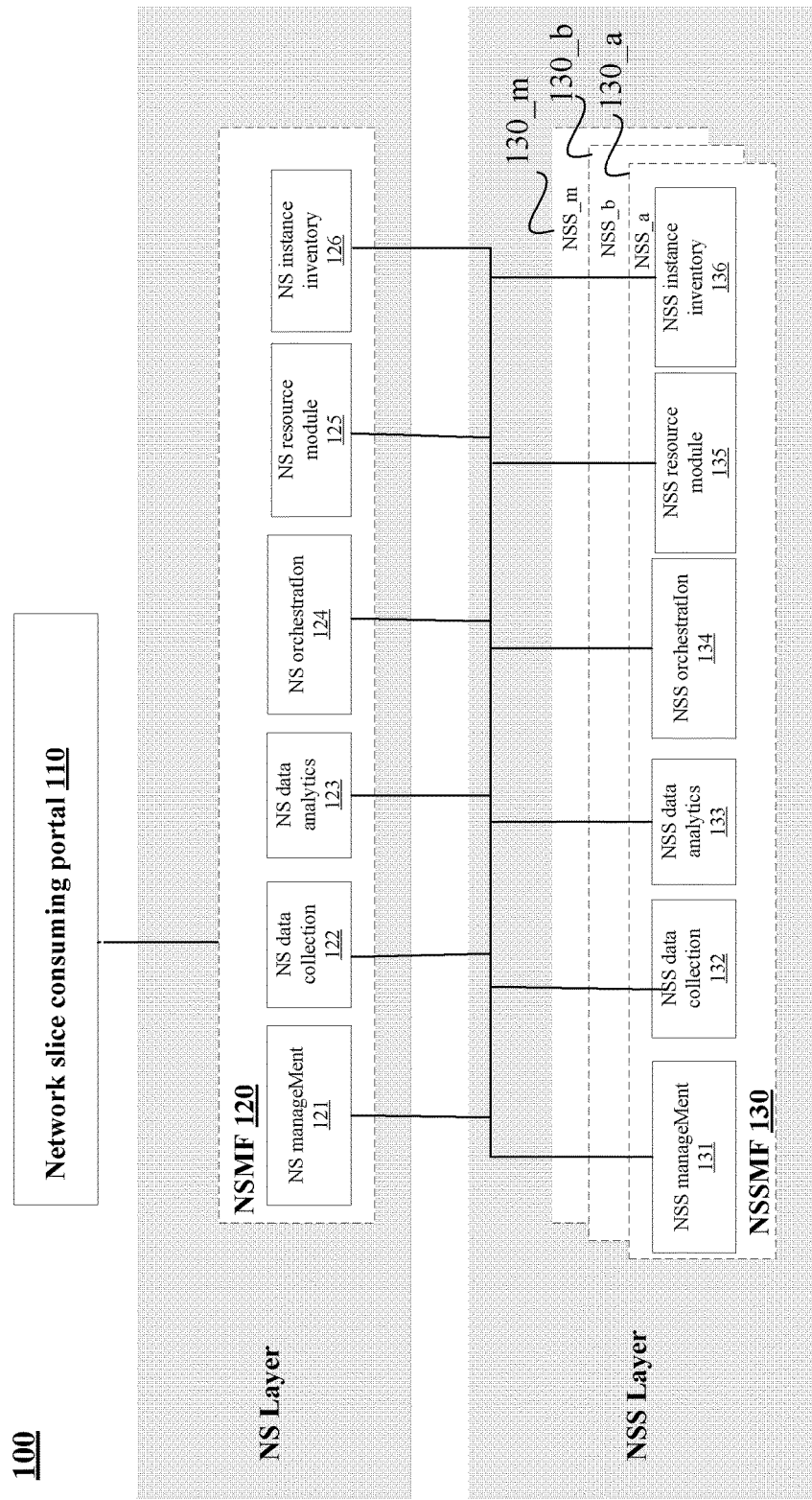
FIG. 1 illustrates an exemplary architecture of network slice management and orchestration in which embodiments of the present disclosure can be implemented.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

The present disclosure is directed to prevent network attacks in a network slice by deploying and configuring security function instances in constituent network slice subnet instances. Different groups of UEs of users from different vertical industries sharing network resources via network slicing will require different levels of security protection. The security policies/rules of associated security functions, such as data filtering in the Firewalls (e.g., at the edge of a core network), might be different and could be changed dynamically. Thus, it's suggested to dynamically configure security policies/rules for the security functions, in order to support an automatic protection against the network attacks.

The security functions deployed in constituent NSSIs (Network Slice Subnet Instances) of a network slice instance e.g. in CN NSSI or even at UPF (User Plane Function) should not be managed separately. Instead, security functions in each NSSI should have knowledge of the security status of other NSSIs (e.g., AN NSSI, TN (Transport Network) NSSI), to avoid inconsistence among different NSSIs. For example, a data filtering policy/rule in a Firewall deployed for a NSSI might be inconsistent with or even conflicted with policies/rules of other constituent NSSIs. Furthermore, the deployment and configuration of security functions in each NSSI should be aware of security considerations in the service profile of the network slice.

Therefore, the present disclosure is to consider to prevent network attacks at NSS domains of a network slice by deploying and running security functions (e.g., Firewalls) from a holistic point of view, e.g., a holistic view regarding edge protection. For example, in this way, the network attacks to a CN NSSI via an interface N6 as well as network attacks to other NSSIs (e.g., AN NSSI, TN NSSI) could be prevented jointly with high efficiency.

FIG. 1 illustrates an exemplary architecture of network slice management and orchestration in which embodiments of the present disclosure can be implemented. The architecture 100 of network slice management and orchestration comprises Network Slice Management Function (NSMF) 120 and Network Slice Subnet Management Function (NSSMF) 130. The NSMF 120 operates in a network slice (NS) layer, which is directed to functions and operations with regard to network slices. The NSMF 120 is responsible for management and orchestration of network slice instances (NSIs), derive network slice subnet related requirements from network slice related requirements; and communicate with the NSSMF 130 and Communication Service Management Function (not shown). As indicated for example in 3GPP TS 23.501, a network slice (NS) refers to a logical network that provides specific network capabilities and network characteristics, supporting various service properties for network slice customers. A network slice instance (NSI) is an instance of network slice. A network slice instance comprises a set of network function instances and the required resources (e.g. compute, storage and networking resources) which form a deployed network slice.

The functions of the NSMF 120 can distributed into multiple functionality entities, for example, which comprise a NS orchestration 124, a NS resource modeling 125, a NS instance inventory 126, a NS management 121, a NS data collection 122, and a NS data analytics 123. The NS orchestration 124 can be configured to receive a request for allocation resource for a network slice with certain characteristics (e.g. service profile including network slice type (e.g. eMBB), priority, bandwidth, latency, throughput, maximum number of UEs, etc. parameters) from a network slice consuming portal 110. The NS orchestration 124 can map the received request to an appropriate resource module (e.g. the chained network slice subnets) and network slice subnet requirements (e.g. network slice profile, network slice subnet type (e.g. radio access network eMBB (Enhanced Mobile Broadband), core network eMBB), priority, bandwidth, latency, throughput, maximum number of UEs), in order to satisfy the requirements of the requested network slice service. The NS orchestration 124 can decide that this request for allocation resource for network slice is to be assigned to an existing network slice instance or whether a new network slice instance is to be created, by checking the active network slice instances from the NS instance inventory 126. If there is no active network slice instance for the requested network slice service, then the NS orchestration 124 gets to know the chained network slice subnets (e.g. NSS_a and NSS_b), and then sends the requests for allocation resource of network slice subnet to the corresponding NSS orchestrations (e.g. of NSS_a and NSS_b) separately. The NS orchestration 124 can receive a confirmed response of the allocation of network slice subnet instance from corresponding NSS orchestration (e.g. NSS orchestration 134 of NSS_a), and confirm the allocation of network slice instance to the network slice consuming portal 110.

The NS resource modeling 125 can be configured to store network slice resource model, which describes the static parameters and functional components of network slice, includes service profile, network slice type (e.g. eMBB), additional system feature (e.g. multicast, Edge Computing), priority. The NS instance inventory 126 is configured to store the information about the available network slice instances.

The NS management 121 can be configured to support the following operation for a network slice instance: activation, supervision, performance reporting (e.g. for KPI monitoring), resource capacity planning, and modification. The NS data collection 122 can be configured to collect network data (e.g. service, network slice, network slice subnet, and/or network functions related data) to support improving network performance and efficiency to accommodate and support the diversity of services and requirements. The NS data analytics 123 can be configured to utilize the collected network data to perform analytics in order to assist and complement management services for an optimum network performance and service assurance.

NSSMF 130 operates in a network slice subnet (NSS) layer, which is directed to functions and operations with regard to network slice subnets. NSSMF 130 is responsible for management and orchestration of NSSI, and communicates with the NSMF 120. As indicated for example in 3GPP TS 28.530, a network slice subnet (NSS) is a representation of the management aspects of a set of managed functions and the required resources (e.g. compute, storage and networking resources). A network slice subnet instance (NSSI) refers to an instance of Network Slice Subnet. A network slice can consist of several network slice subnets. Such network slice subnets can be also referred to as a constituent network slice subnets of the network slice. A network slice subnet is created on a network slice subnet domain, such as access network, transport network and core network, and such network slices are composed of connected subnets. A domain is a group of a network and network functions administrated as a unit with common rules and procedures. An NSI typically covers multiple technical domains, which can include terminal, access network (AN), transport network (TN) and core network (CN), as well as data center (DC) domain that hosts third-party applications from vertical industries.

The functions of the NSSMF 130 can be distributed into multiple functionality entities, for example, which can comprise a NSS orchestration 134, a NSS resource modeling 135, a NSS instance inventory 136, a NSS management 131, a NSS data collection 132, and a NSS data analytics 133. The NSS orchestration 134 can be configured to receive the request for allocation resource for a network slice subnet, and map the received request to an appropriate resource module of the "NSS resource module" (e.g. the chained lower level network slice subnet, list of managed network functions and their configuration parameters, network service in virtualization case, etc.). The NSS orchestration 134 can be further configured to decide whether this request for allocation resource for network slice subnet is to be assigned to an existing network slice subnet instance or whether a new network slice subnet instance is to be created by checking the active network slice subnet instances from the NSS instance inventory 136. If there is no active network slice subnet instance, the NSS orchestration 134 sends a request of allocation resource for network service to a related function entity (not shown), such as a NFV-MANO (Network Functions Virtualization Management and Orchestration), in case virtualized resource will be provided. Accordingly, the NSS orchestration 134 can receive a confirmed response of the allocation of network service instance, e.g. from the NFV-MANO, and confirm the allocation of network slice subnet instance to the NSMF 120.

The NSS resource modeling 135 can be configured to store network slice subnet resource model, which describes the static parameters and functional component of network slice subnet, includes network slice profile, network slice subnet type (e.g. radio network eMBB, core network eMBB), additional system feature (e.g. multicast, Edge Computing), priority, QoS attributes (e.g. bandwidth, latency, number of subscribers), and so on. The NSS instance inventory 136 can be configured to store the information about the available network slice subnet instances.

The NSS management 131 can be configured to support the following operation for a network slice subnet instance: activation, supervision, performance reporting (e.g. for KPI monitoring), resource capacity planning, and modification. The NSS data collection 132 can be configured to collect network data (e.g. network slice, network slice subnet, network service, and/or network functions related data) to support improving network performance and efficiency to accommodate and support the diversity of services and requirements. The NSS data analytics 133 can be configured to utilize the collected network data to perform analytics in order to assist and complement management services for an optimum network performance and service assurance.

Figure 2:
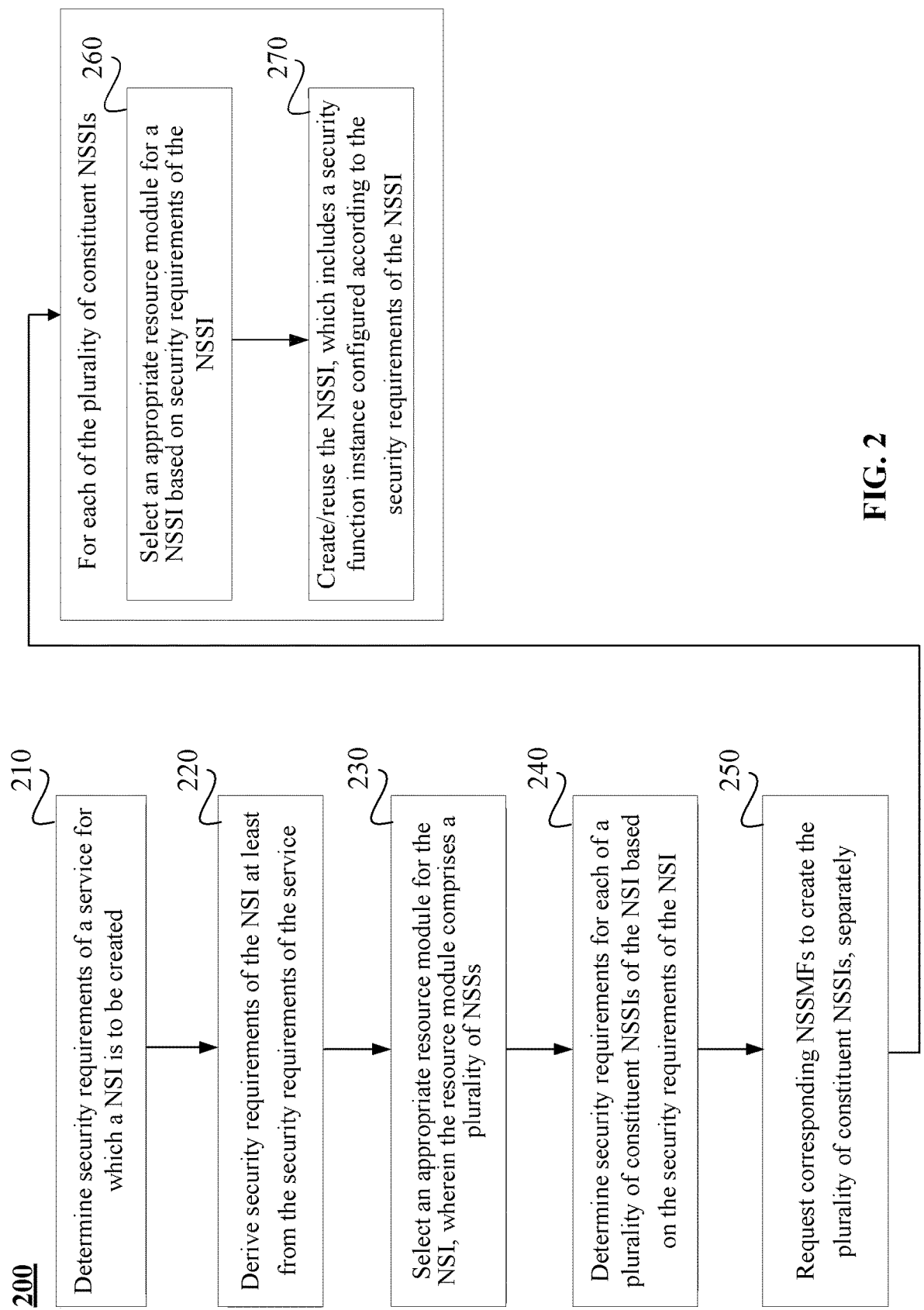
FIG. 2 shows an exemplary procedure of creating and configuring security function instances for a network slice according to embodiments of the present disclosure.

The present disclosure proposes to enhance security orchestration (including policy enforcement) in a network slice layer to support security protection related polices, e.g. a traffic filter policy at an edge of network slice subnet domain. The present disclosure further introduces a security controller in a network slice subnet layer to coordinate the prevention on network attacks in a plurality of NSS domains. FIG. 2 shows an exemplary procedure 200 of creating and configuring security function instances for a network slice according to embodiments of the present disclosure. The procedure 200 is performed during a phase for preparing and creating an end-to-end NSI for a service. Security requirements of the service can be determined as shown in operation 210. These security requirements can be defined as a part of a service level specification, which comprise a set of service level requirements associated with a service level agreement to be satisfied by a network slice instance. In an example, a service profile of the service comprises various requirements of the service, e.g., requirements of data speed, quality, latency, security, etc. which are indicated with corresponding attributes. The security requirements of the service can be determined from attributes of security, e.g., an attribute parameter can be set to indicate that a security protection at the edge of network slice is required. Alternatively or additionally, the security requirements of the service can be determined based on a security baseline of a type of the service, e.g., IoT, healthcare, games, etc. For example, the security baseline may be default security controls defined according to network threats and corresponding security policies. As an alternative, a consumer of a network slice could set security requirements in the service profile.

At least from the security requirements of the service, security requirements of the NSI can be derived, as shown at 220. For example, the service profile comprising requirements of data speed, quality, latency, security, etc., for example, with corresponding attributes, can be translated into a slice profile (e.g., data speed, quality, latency, security protection requirement, etc.) by a management functionality entity (e.g. NSMF) in a network slice layer. Accordingly, security requirements with the attributes of security (e.g., security protection at the edge of network slice) in the service profile can be translated into security requirements of the network slice instance with attributes of security protection requirement, e.g., Firewall.

At the operation 230, an appropriate network slice resource module is selected to prepare to create an NSI satisfying the derived security requirements. The resource module comprises a plurality of NSSs, such as AN (access network) NSS, TN (transport network) NSS, CN (core network) NSS, or other NSSs for specific functions or services, such as a network protection specific NSS, an NSS for VoIP (Voice over Internet Protocol) or IMS (IP Multimedia Subsystem). In this regard, the constituent NSSIs and the topology of the NSI to be created can be decided using information from the service profile, which can comprise the security requirements of the NSI and other kinds of requirements of the NSI. In an example, the selection of the network slice resource module can be further based on the security baseline of the service and the network topology.

At the operation 240, security policies for each of a plurality of constituent NSSIs of the NSI, is determined based on security requirements of the NSI. In this regard, the security requirements of the NSI can be broken down to resource requirements of the plurality of constituent NSSIs, so as to derive security policies of each constituent NSSI. The security policies of each constituent NSSI can be reflected into NSS service/slice profile. The security policies (e.g., general data filtering rules) for each constituent NSSI are derived from an aspect of the whole NSI. As such, those security policies of each constituent NSSI can be correlated, to deploy and configure security functions in each NSS domain and further cooperate and collaborate, so as to support the security requirements of the NSI in a whole. Further, security policies of constituent NSSIs supporting one NSI are determined to ensure that they are consistent and completion. For example, there is no need to prevent/block same network attacks repeatedly in each NSS domain (e.g., AN NSS, CN NSS, TN NSS). It is enough to deploy security functions for a kind of network attack in one suitable NSS domain. In this way, the network attack can be prevented or blocked with a high performance, and the overhead on NSS domains can be reduced.

There is an example to explain how to derive security policies for each constituent NSSI in a slice layer. According to a service profile with the attributes of security which indicates a security protection at the edge of network slice, a management functionality entity in the network slice layer can translate the service profile into a slice profile (e.g., data speed, quality, latency, security protection requirement, etc.) with the attributes of security protection requirement (e.g., Firewall). Then, a management functionality entity can select a network slice resource model, which comprises AN NSS, TN NSS, and CN NSS for example, and prepare to create an NSI accordingly. The derived security policies for each constituent NSSI can be corresponding traffic filter functions deployed at the edge of corresponding NSS domains as follows, for example.

The management functionality entity can define a data filtering policy to prevent DDoS attacks from IoT devices for the AN NSS domain;

The management functionality entity can define a data filtering policy to prevent attacks from the internet for the CN NSS domain; and The management functionality entity can define a data filtering policy to steer traffics for the TN NSS domain.

Then, the management functionality entity can request corresponding NSSMFs to create the constituent NSSIs separately, as shown at 250. For example, a NSMF can send a request to respective NSSMF of each NSS domain of the constituent NSSIs, to allocate network resources to create a NSSI which supports the corresponding security policies. The request can contain NSS related requirements including the corresponding security policies.

For each constituent NSSI, a NSSMF in the corresponding NSS domain can select an appropriate NSS network resource model based on the NSS related requirements including the corresponding security policies, as shown at 260. Then, a NSSI can be created to support the corresponding security policies, as shown at 270. The NSSI can include one or more security function instances (e.g., Firewall) or security NSSI (e.g. a Firewall NSSI), that are configured according to the security policies to protect the corresponding NSS domain. In some embodiments, the NSSI or the security functions are shared by multiple network slice instances, or the security functions are associated with other constituent NSSIs of a same network slice instance. In this case, it would be important to check whether that the security functions have a negative effect on other relevant network slices or relevant NSSIs.

In some embodiments, based on the NSS related requirements including the corresponding security policies, a NSSMF can determine to reuse an existing NSSI. Then, the NSSMF can trigger to update or modify the existing NSSI to satisfy the NSS related requirements including the corresponding security policies. Configurations of corresponding security function instances can be updated according to the security policies. When updating or modifying the existing NSSI, it would be important to check whether that the security policy have a negative effect on the existing NSSI which serves for other network slices or services.

In some embodiments, the security function instances comprise a Firewall, which is deployed at the edge of NSS domains. Through Firewalls in each constituent NSSI, network attacks can prevented/blocked successfully at the edge of all NSS domains. Consequently, network attacks can be prevented/blocked at the edge of a network slice domain of the NSI.

In some embodiments, a separate security NSSI can be created and deployed at the edge of a NSI or its constituent NSSIs, to support the security requirements of the NSI. For example, the security requirements of the NSI can be all translated to requirements of the security NSSI. The security NSSI can detect and prevent/block network attacks for the whole NSI. Details of this scenario are to be described later with reference to FIGS. 5 and 6.

Figure 3:
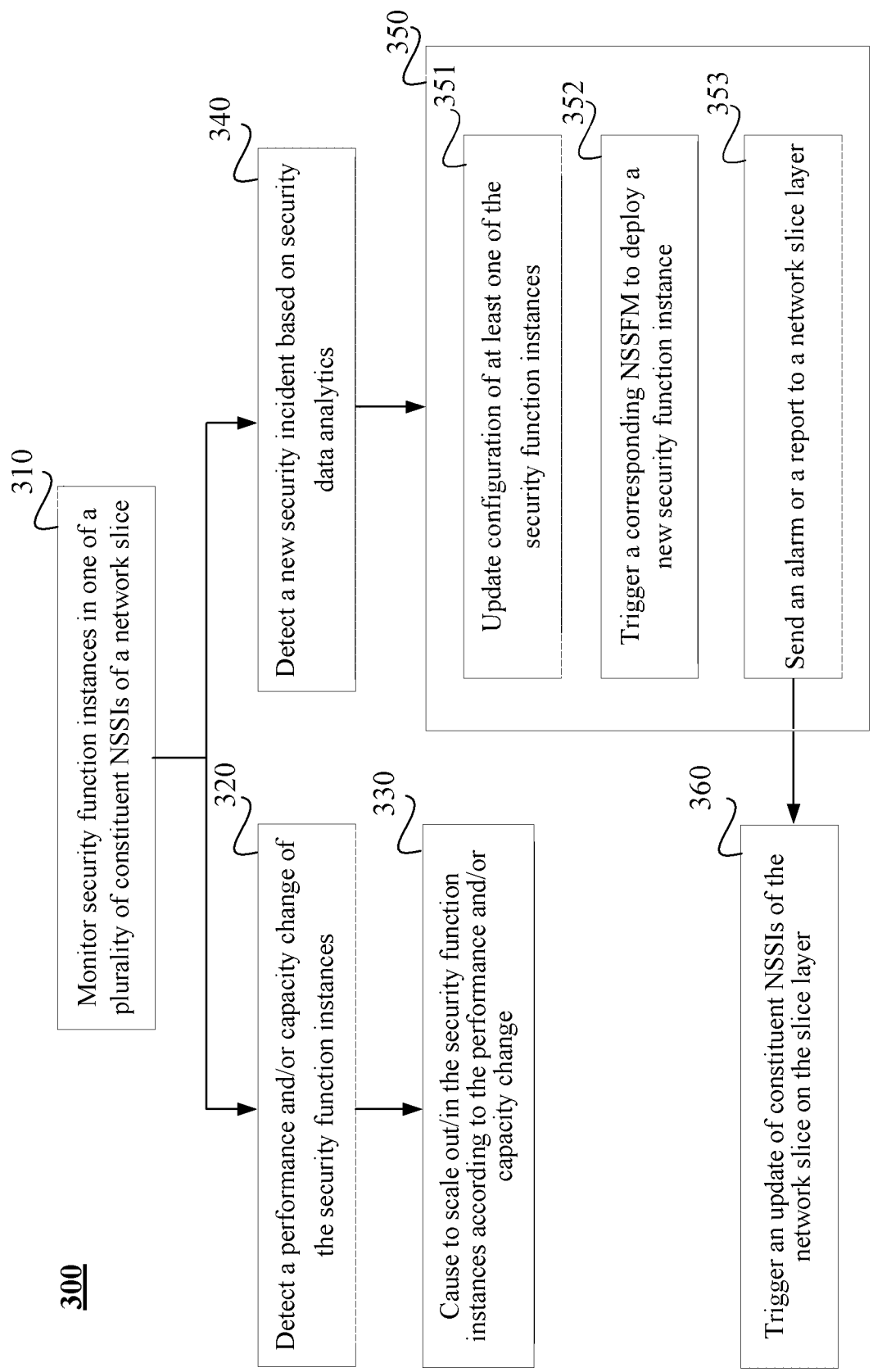
FIG. 3 shows an exemplary procedure of adjusting security function instances for a network slice according to embodiments of the present disclosure.

Now reference is made to FIG. 3, which shows an exemplary procedure of adjusting security function instances for a network slice instance. During a phase of end-to-end NSI operation, security policies/rules are enforced by the security function instances in each NSS domains. For example, Firewalls can enforce corresponding security policies/rules at the edge of each NSS domain. As shown at 310, the security function instances in one constituent NSSIs of a network slice can be monitored by a management functionality entity in an NSS layer, such as a security controller or a corresponding NSSMF.

In some embodiments, the management functionality entity can detect a performance and/or capacity change of the security function instances, as shown at 320. When a performance and/or capacity change is detected the management functionality entity can cause to scale out/in security functions according to the performance or capacity change of the NSSI, as shown at 330. For example, it may be detected that the capacity of a Firewall at the edge of a NSS domain is not enough, when a data rate increases suddenly. The management functionality entity can cause the NSSMF in this NSS domain to re-allocate network resource, and deploy additional Firewall at the edge of the NSS domain.

In some embodiments, the management functionality entity can detect a new security incident based on security data analytics in the running of the NSI as shown at 340, and respond to the new security incidents dynamically and automatically at 350. More specifically, in an example, in response to a detection of a new security incident, a configuration of an existing security function can be updated to deal with the new security incident, as shown at 351. For example, when a new network attack is detected, a NSSMF can check its security policy, and find that the security policy of security functions (e.g., Firewall) could not prevent the detected new network attacks. Then the NSSMF can configure a deployed security function with a new security policy. After that, the security function can enforce the latest configured policy to prevent the new network attack.

In another example, in response to a detection of a new security incident, an NSSMF can be triggered to deploy a new security function (e.g., Firewall) to deal with the new security incident, as shown at 352. For example, if a new network attack is detected, and if the existing firewalls could not block the new network attack, a new enhanced Firewall can be deployed.

In another example, in response to a detection of a new security incident, the management functionality entity in the NSS layer can send an alarm or a report to a NS layer or escalate the new security incident to the NS layer as shown at 353, for example, in case that it cannot handle the new security incident. In response, a management functionality entity in the NS layer can trigger an update on constituent NSSIs of the NSI, as shown at 360. In this regard, security policies for constituent NSSIs can be adjusted to deal with the new security incident coordinately. For example, security policies for a NSSI reporting a new network attack and/or other associated NSSIs of the NSI can be updated. In an example, an existing NSSI can be updated or a new NSSI can be created to prevent/block the new network attack. The update on constituent NSSIs of the NSI can be performed with reference to operations 240-270.

Figure 4:
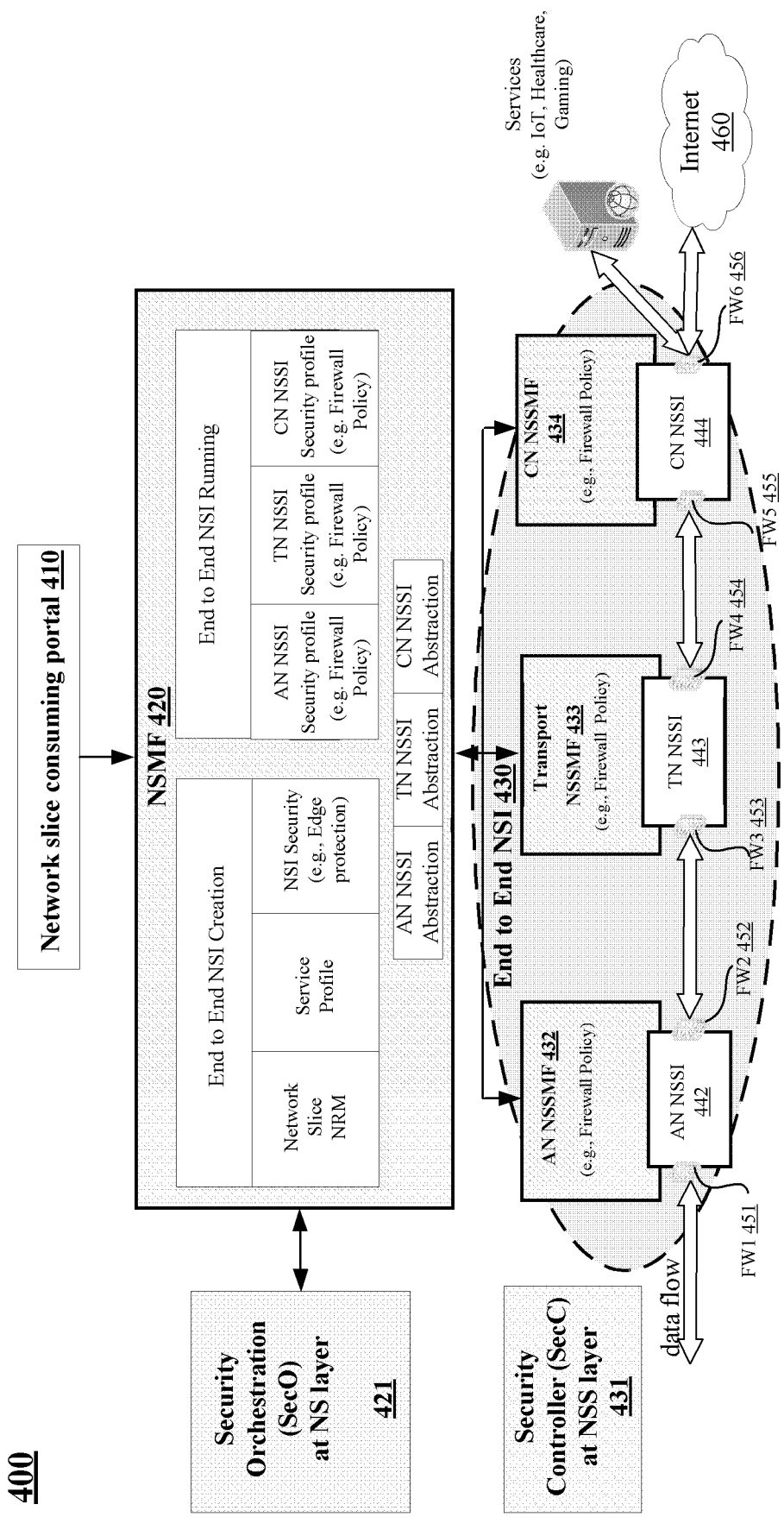
FIG. 4 illustrates an exemplary system in which security function instances are configured at an edge of respective network slice subnet instances according to embodiments of the present disclosure.

Reference is now made to FIG. 4, which illustrates an exemplary system 400 in which security function instances are configured at an edge of constituent NSSIs according to embodiments of the present disclosure. A procedure for creating and configuring the security function instances at the edge of NSS domains to prevent network attacks can be described as below.

In a first phase, a NSMF 420 receives a request from a network slice consuming portal 410 to create a network slice instance for a service. For example, the service may be IoT service, gaming, healthcare, etc. The request can contain a service profile which specifies requirements of the service (such as, data speed, quality, latency, security, etc.) and corresponding attributes. In particular, the service profile contains security requirements of the service with corresponding security attributes. In an example, the security attribute indicates that a security protection at the edge of the network slice is required. In some embodiments, the security requirements may be proposed by a consumer of the network slice. For example, the security requirements may be determined through a negotiation between the consumer and a provider/operator of network slices. In some embodiments, the security requirements may be obtained by the NSMF 420 from a security baseline (e.g., security controls defined according to network threats and corresponding security policies) of a service type of the request service (e.g., IoT, healthcare, games).

The service profile (e.g., data speed, quality, latency, security, etc.) can be transferred into a slice profile (e.g., data speed, quality, latency, security requirements, etc.). In some embodiments, a management functionality entity, such as a security orchestration (SecO) 421 can be arranged in a network slice layer, to transfer service level security requirements defined in the service profile into slice level security requirements, and in turn maintain the service profile into slice level security requirements in a slice profile of the end-to-end NSI. As shown in FIG. 4, the SecO 421 can be deployed separately outside the NSMF 420. However, it should be appreciated that the SecO 421 is a logical function, and can be deployed inside the NSMF 420 as a single component, or distributed in one or more existing components in the NSMF 420. In an example, the NSMF 420 calls the SecO 421 to translate the security attributes (e.g., security protection at the edge of network slice) of the service profile into the security requirement (e.g., Firewall) of the slice profile.

Next, in a second phase, based on a network slice network resource model (e.g., AN NSS, TN NSS, and CN NSS) and the slice profile (e.g., data speed, quality, latency, security requirement, etc.), the NSMF 420 sends requests to respective NSSMFs (e.g. an AN NSSMF 432, an TN NSSMF 433, and an CN NSSMF 434) for the AN NSS, TN NSS, and CN NSS, separately, to create respective NSSIs (e.g. an AN NSSI 442, a TN NSSI 443, and a CN NSSI 444) with protection at an edge of respective NSS domains (an AN NSS domain, a TN NSS domain, and a CN NSS domain) to prevent network attacks. The requests may contain security policies of respective NSS which are derived from security requirements defined in the slice profile. For example, the SecO 421 can define data filtering policies at the edge of corresponding NSS domains for respective NSSIs as below:

AN NSS domain: DDoS (Distributed Denial of Service) protection, Carrier Grade NAT (Network Address Translation), QoS (Quality of Service) policy enforcing, L7 inspection, Traffic Steering, etc.;

TN NSS domain: Traffic Steering, QoS policy enforcing, etc.; and

CN NSS domain: Traffic Steering, Application Layer Gateway, Carrier Grade NAT, DDoS protection, L7 inspection, QoS policy enforcing, etc.

In some embodiments, the security function may be deployed through a dedicated Security (e.g. Firewall) NSS. A dedicated Security NSSI may be created to prevent network attacks at the edge of the network slice instance.

In a third phase, in each NSS domain, a corresponding NSSMF can create a NSSI with deploying security functions (e.g., Firewalls) at the edge of the NSSI domain, based on a NSS network resource model and security policies in the received request. In some embodiments, a management functionality entity such as a security controller (SecC) can be implemented in a network slice subnet layer to manage or configure security functions in each NSS domain. As shown in FIG. 4, a SecC 431 (such as a Firewall Manager) can be deployed as a separate functionality entity outside each NSS domain, and can control security functions in multiple NSS domains. It should be noted that the SecC 431 is a logical function, which can be deployed as a stand-alone functionality entity at the NSS layer, or deployed at each NSS domain separately, or as a part of respective NSSMF.

In an example, with an assistance of the Firewall Manager 431, the AN NSSMF 432 can create an AN NSSI 442 with deploying security functions (e.g., Firewall 451 and Firewall 452) at the edge of the domain of the AN NSSI 442. The Firewall Manager 431 can be triggered to configure firewall policies for Firewall 451 and Firewall 452, according to the security policies defined for the AN NSSI 442. For example, the Firewall 451 can be configured to enforce a DDoS protection, Carrier Grade NAT, QoS policy enforcing, and Traffic Steering; and the Firewall 452 can be configured to enforce a Carrier Grade NAT.

With an assistance of the Firewall Manager 431, the TN NSSMF 433 can create a TN NSSI 443 with deploying and configuring security functions (e.g., Firewall 453 and Firewall 454) at the edge of the TN NSS domain in the same way. For example, the Firewall 453 and Firewall 454 can be configured to perform Traffic Steering and QoS policy enforcing according to the security policies defined for the TN NSSI 443. Similarly, the CN NSSMF 434 can create a CN NSSI 444 with deploying and configuring security functions (e.g., Firewall 455 and Firewall 456) at the edge of the CN NSS domain. According to the security policies defined for the CN NSSI 444, the Firewall 455 can be configured to perform Carrier Grade NAT, and the Firewall 456 can be configured to perform Traffic Steering, Application Layer Gateway, Carrier Grade NAT, DDoS protection, L7 inspection, QoS policy enforcing, IPS, and AV, for example.

When a NSSMF create a constituent NSSI for a network slice with deploying security functions, e.g., a Firewall at the edge of a NSSI domain, the Firewall Manager 431 can check to confirm that it would not cause any negative effect on other relevant network slices or other relevant NSSIs. In the regard, the Firewall Manager 431 can maintain security policies (e.g. Firewall policies) per network slice instance, and check if the security policy (e.g. data filter policy/rule applied for a Firewall) of the constituent NSSI is consistent with or conflicted with security policies (e.g. data filter policy/rule) applied for other network slice instances which are sharing the NSSI, for example for other network slice services. Alternatively or additional, the Firewall Manager 431 can check if the security policy of the constituent NSSI is consistent with or conflicted with security policies applied for other constituent NSSIs of the same network slice instance. For example, if data filter policy/rule of one NSSI is inconsistent with or conflicted with the policy/rule of other relevant NSIs and/or other relevant NSSIs, the Firewall Manager 431 may deploy a physical security function (e.g. a Firewall) or a virtualized security function (e.g. a virtual Firewall) dedicated for this newly created NSSI. In this way, the negative effect on other network slice instances or other NSSIs can be avoided.

Then, the requested NSI 430 can be created with a capability to prevent network attacks for inter-NS (network slice) communications and intra-NS communications, as well as to prevent network attacks at the edge of network slice (e.g., an interface N6 between a CN NSS domain and the internet 460) effectively.

As in FIG. 4, security policies can be enforced by six Firewalls running at the edge of domains for the AN NSSI 442, TN NSSI 443 and CN NSSI 444, to prevent network attacks during an operation of the end to end NSI 430. In order to monitor security status of this NSI 430, security data can be collected and analyzed. Based on security data analytics, some new network attacks may be detected, for example by using normal techniques. The details of detecting new network attacks based on security data analytics are not the focuses of this disclosure.

When a new network attack is detected at the edge of a NSS domain, a NSSMF of this NSS domain can be notified to take some actions to prevent this new network attack. For example, when the new attack is detected through a data flow between the CN NSSI 444 and the Internet 460 in FIG. 4, the CN NSSMF 434 will be notified to take some actions as following.

In some embodiments, the Firewall Manager 431 or a logical Firewall management function of the CN NSS, can check the Firewall policy applied to Firewall 456, and find that the firewall policy could not prevent the detected new network attack. Then, the Firewall Manager 431 or the logical Firewall management function of the CN NSS can reconfigure the Firewall 456 with a new or an additional Firewall policy. After that, the Firewall 456 enforces the latest configured policy to prevent the new network attack.

In some embodiments, the Firewall Manager 431 or the logical Firewall management function of the CN NSS can check the firewall policy applied to Firewall 456, and find that existing Firewall policy could not prevent the detected new network attack. Then, the Firewall Manager 431 or the logical Firewall manager function of the CN NSS may trigger to deploy a new Firewall to mitigate the risk. In some situation, the Firewall Manager 431 or the logical Firewall management function of the CN NSS does not know how to prevent the new network attack. At this time, the Firewall Manager 431 or the logical function Firewall manager of the CN NSS can send an alarm to the SecO 421. The SecO 421 may know how to prevent the new network attack, and then trigger the NSMF 420 to re-allocate network resources and update security policies for associated NSSIs to cooperate with the Firewall 456. For example, the associated NSSI may be the TN NSSI 443 or a dedicated Security NSSI. That means, the constituent NSSIs of the NSI 430 would be updated. Otherwise, if the SecO 421 may not know how to prevent the new network attack, the SecO 421 can send an alarm to higher level administrator. That means, the NSMF 420 would update the NSI 430.

In some embodiments, the Firewall Manager 431 or the logical Firewall management function of CN NSS may find that existing Firewall policy in the Firewall 456 is enough to prevent the network attacks at the edge of CN NSSI domain. However, data rate increases suddenly at the edge of CN NSSI domain, and the capacity of the Firewall 456 is not enough to do data filtering. At this time, the Firewall Manager 431 or the logical Firewall management function of CN NSS may trigger the CN NSSMF 434 to deploy an additional Firewall at the edge of CN NSSI domain and cooperate with the Firewall 456 to do data filtering. That means, the CN NSSI 444 is updated.

Figure 5:
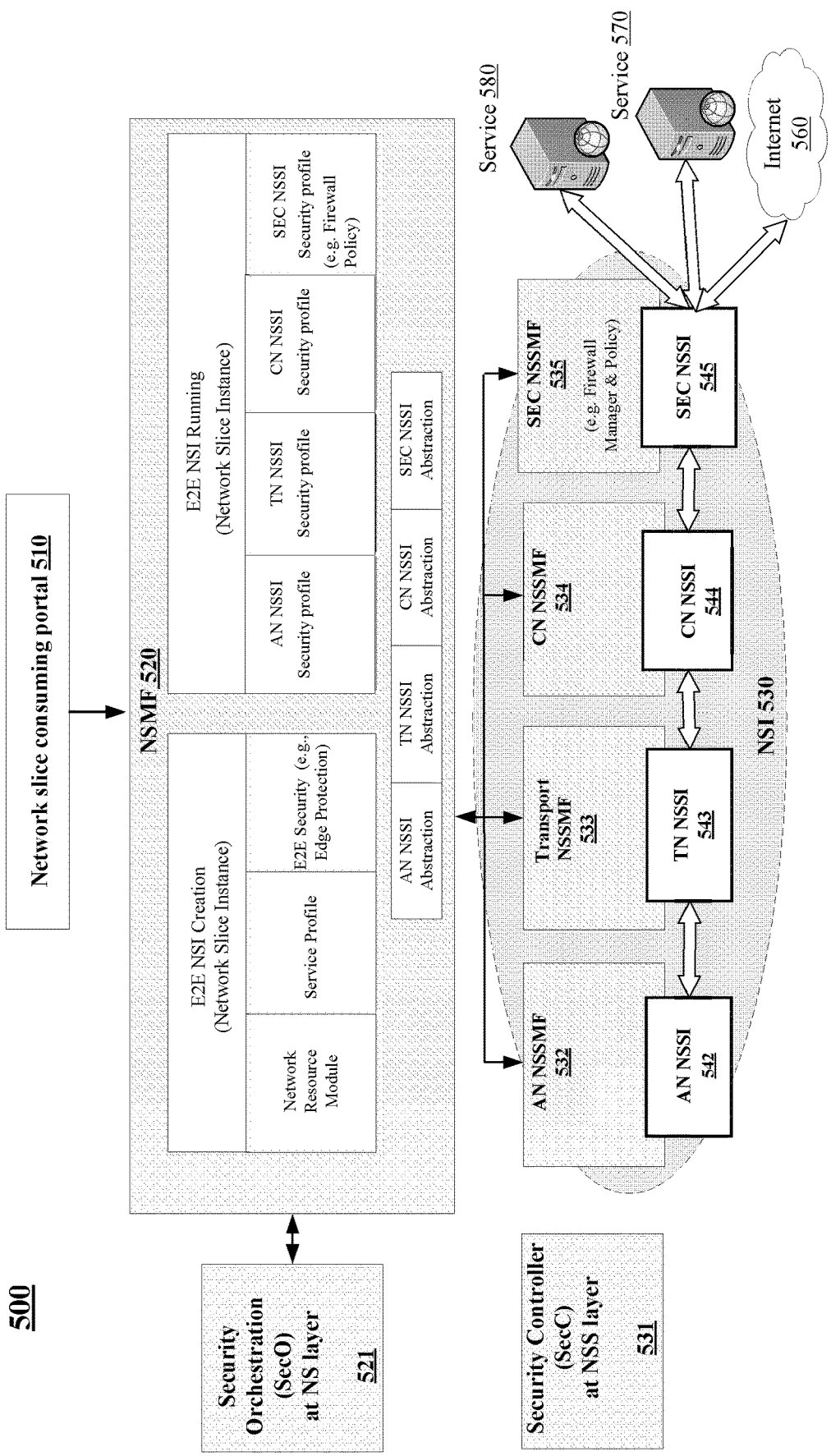
FIG. 5 illustrates an exemplary system in which a separate security function instance is configured at an edge of a network slice instance according to embodiments of the present disclosure.

Now reference is made to FIG. 5, which illustrates an exemplary system in which a separate security function instance is configured at an edge of a network slice instance according to embodiments of the present disclosure. In some cases, it can be assumed that communications between respective domains of constituent NSSIs of a NSI are secure. Then, separate security function instances can be deployed only at the edge of the NSI.

For example, an enterprise may request a separate NSI 530 for their corporate services. The NSI 530 can be consisted of an AN NSSI 542, a TN NSSI 543, and a CN NSSI 544. It should be noted that the NSI 530 can be consisted of other combination of NSSIs. For example, the NSI 530 can be consisted of a TN NSSI and a CN TSSI. In an example, it can be assumed that communications between an AN NSS domain and a TN NSS domain, and communications between the TN NSS domain and a CN NSS domain are secure. Thus, it is unnecessary to deploy security functions at the edges between AN NSSI 542 and TN NSSI 543, and the edges between TN NSSI 543 and CN NSSI 544. It can be also assumed that base stations are deployed within the office park and radio access is secure. Thus, it is unnecessary to deploy security functions at the edges of AN NSSI 542 between the AN NSSI 542 and UEs. However, the communications between the CN NSSI domain and the Internet 560 or networks for services 570 and 580 is not secure, when the users of the NSI 530 access the Internet 560 or services 570 and 580. So, it's very important to prevent network attacks at this edge of the NSI 530.

As shown in FIG. 5, a separate security NSSI 545 can be created and deployed at the edge of the NSI 530, to prevent network attacks from different services and different network layers automatically. During a preparation and creation of the SEC NSSI 545, NSMF 520 can request the SEC NSSMF 535 to allocate the SEC NSSI 545 to protect Internet/Service interface of the NSI 530 according to security requirements included in service/slice profile. The SEC NSSMF 535 may create or reuse the SEC NSSI 545 to satisfy the security requirements of the NSI 530 received from the NSMF 520. In an example, the SEC NSSMF 535 can break down the security requirements to security functions and polices of respective security functions. Then, the security functions can be deployed and configured according to corresponding policies. For example, a Firewall manager or a logical Firewall management function can be deployed in the SEC NSSMF 535 to break down the requirements to Firewalls and polices of Firewalls, then deploy Firewalls and configure corresponding policies on the Firewalls. The SEC NSSI 545 can be allocated before the allocation of the AN NSSI 542, the TN NSSI 543 and the CN NSSI 544.

During a runtime, the security function instances in the SEC NSSI 545 can proceed ingress/egress data based on corresponding security polices and report security status and related security events. The SEC NSSMF 535 may trigger to update or scale security functions, for example based on changes in the security requirements, in network capacity, or in security posture, etc.

Figure 6:
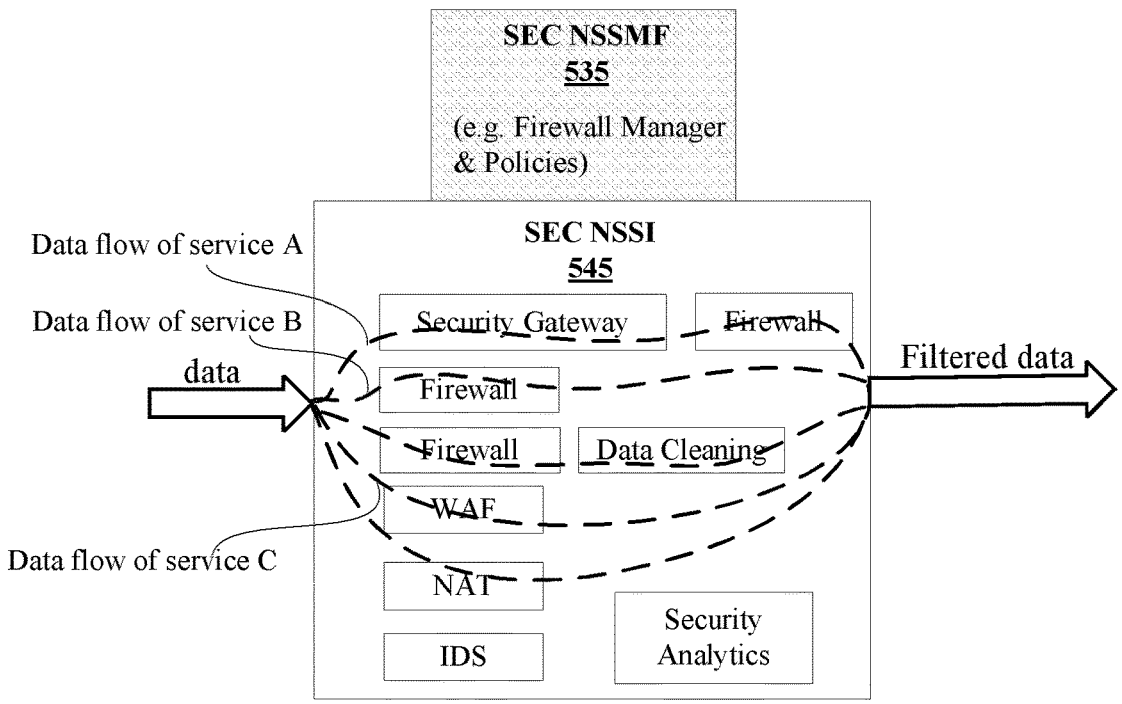
FIG. 6 illustrates the capability of a security function instance to prevent network attacks at an edge of a network slice instance according to embodiments of the present disclosure.

A SEC NSS can have capabilities to prevent network attacks from different services and different network layers, as shown in FIG. 6. For example, a Firewall Manager of SEC NSSMF 535 can deploy and configure security functions "Security Gateway" and "Firewall" for a service A, another security function "Firewall" for a service B, and a security function "WAF (Web Application Firewall)" for a service C (e.g., Internet services). The SEC NSSI 545 can filter data of different services or network layers through corresponding security functions by identifying the data based on corresponding identifiers, such as a service identifier, a user identifier, a network slice identifier, and/or a network slice subnet identifier, etc.

Figure 7:
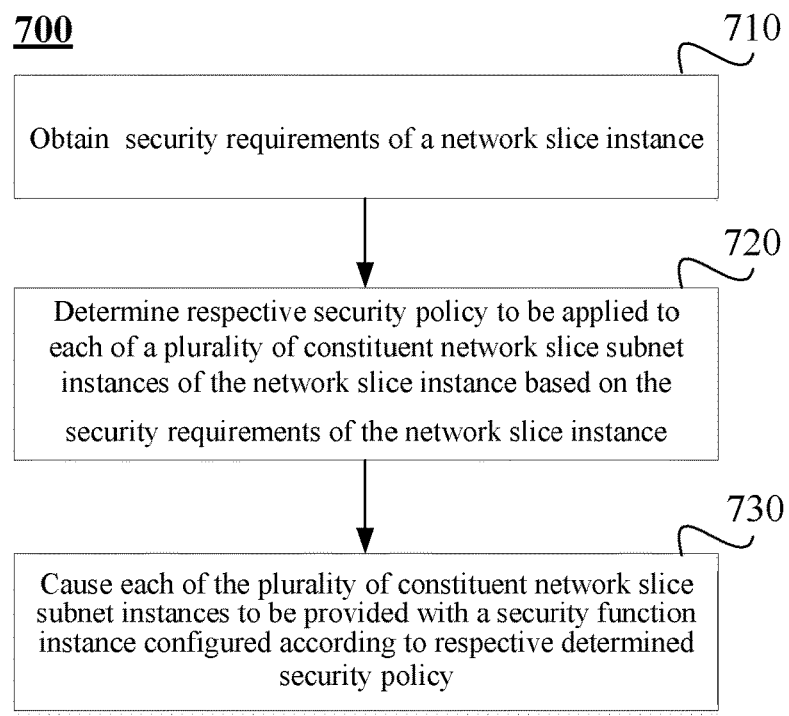
FIG. 7 is a flow chart depicting a method according to an embodiment of the present disclosure.

Reference is now made to FIG. 7, which illustrates a flowchart of a method according to an embodiment of the present disclosure. The method can be performed at a network slice layer, e.g. by the SecO 421, the NSMF 420, the SecO 521, the NSMF 520 as shown in FIGS. 4 and 5.

As shown at block 710, a procedure 700 proceeds to obtain security requirements of a network slice instance. At block 720, the procedure 700 proceeds to determine respective security policy to be applied to each of a plurality of constituent network slice subnet instances of the network slice instance, based on the security requirements of the network slice instance. The security requirements of the network slice instance can be broken down into separate security requirements corresponding to each of the plurality of constituent network slice subnet instances. Then, the respective security policy can be derived based on the separate security requirements corresponding to each of the plurality of constituent network slice subnet instances. At block 730, the procedure 700 proceeds to cause each of the plurality of constituent network slice subnet instances to be provided with one or more security function instances configured according to respective determined security policy. As such, the security policy of each constituent network slice subnet instance can be deployed from a holistic point of view, i.e. from a holistic view regarding the protection of the network slice instance.

In some embodiments, the procedure 700 is performed during a creation of the network slice instance. The procedure 700 can further comprise receiving a request for allocating the network slice instance for a service; determining security requirements of the service; and determining the security requirements of the network slice instance according to the security requirements of the service. A network slice network resource module for the network slice instance can be selected based on the security requirements of the network slice instance. A new network slice instance is created or an existing network slice instance is reused, according to the selected network slice network resource module. The network slice network resource module defines a plurality of constituent network slice subnets of the network slice instance. According to the selected network slice network resource module, a new network slice instance can be created, or an existing network slice instance can be reused for the service.

The procedure 700 can further comprise sending corresponding requests to allocate the plurality of constituent network slice subnet instances for the network slice instance. Each of the corresponding requests can contain respective security policy of corresponding constituent network slice subnet instance. In an example, a request can be sent, for example to respective NSSMF, to create or reuse at least one network slice subnet instance of the plurality of constituent network slice subnet instances. The request can contain a respective security policy determined for the at least one network slice subnet instance.

In some embodiments, the procedure 700 can be performed during an operation of the network slice instance. In an example, the procedure 700 can further comprise updating security requirements of a network slice instance and further updating the network slice instance. Then a request can be sent to update at least one network slice subnet instance of the plurality of constituent network slice subnet instances. The request contains a security policy determined for the at least one network slice subnet instance.

In another example, the procedure 700 can further comprise receiving a report or an alarm indicative of a security incident in one of the plurality of constituent network slice subnet instances; and updating the security requirements of the network slice instance based on the security event. A security policy of at least one network slice subnet instance of the plurality of constituent network slice subnet instances can be updated based on the security incident. Then, the procedure 700 can cause the at least one network slice subnet instance to be updated with one or more security function instances configured according to the updated security policy. A request to update at least one network slice subnet instance can be sent, for example to a respective NSSMF of the at least one network slice subnet instance. The request can contain a security policy determined for the at least one network slice subnet instance. The network slice subnet instance to be updated may be different from the network slice subnet instance reporting the security incident.

In some embodiments, the security function instance can be deployed at an edge of respective network slice subnet instance. In some embodiments, a security network slice subnet instance is deployed at the edge of the network slice instance to support the security requirements of the network slice instance. The procedure 700 can further comprises sending a request to create the security network slice subnet instance. The request can contain a security policy to be applied to the security network slice subnet instance. The security policy is determined according to the security requirements of the network slice instance.

Figure 8:
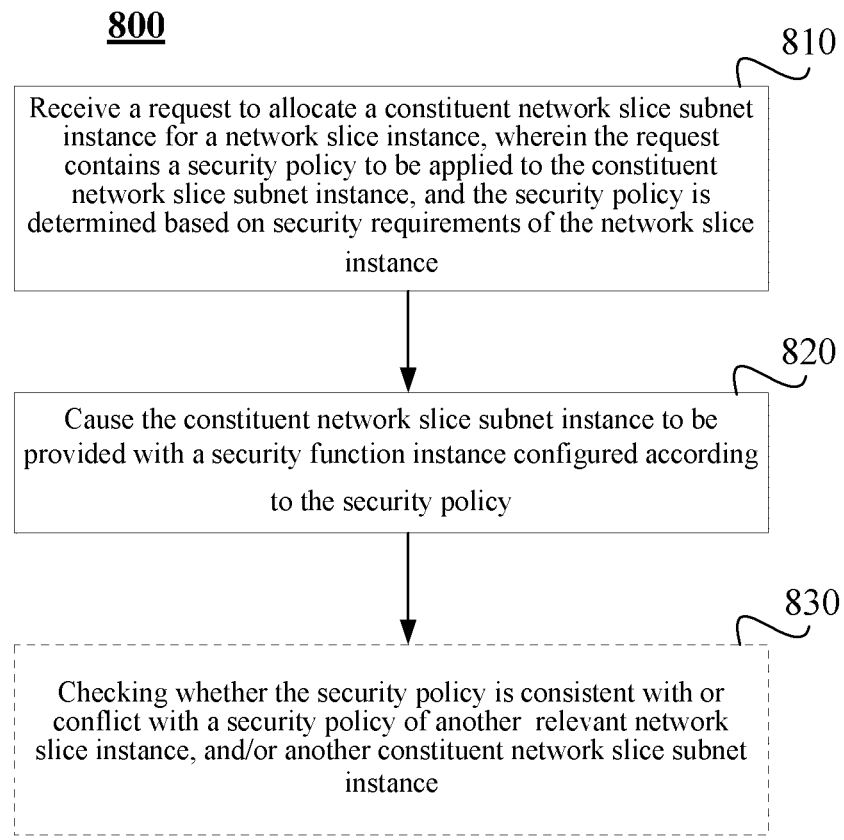
FIG. 8 is a flow chart depicting a method according to an embodiment of the present disclosure.

FIG. 8 is a flow chart depicting a method according to an embodiment of the present disclosure. The method can be performed at a network slice subnet layer, e.g. by the SecC 431, 531, and Firewall Managers as shown in FIGS. 4, 5 and 6.

As shown at block 810, a procedure 800 proceeds to receive a request to allocate a constituent network slice subnet instance for a network slice instance. The request contains a security policy to be applied to the constituent network slice subnet instance. At block 820, the procedure 800 proceeds to cause the constituent network slice subnet instance to be provided with one ore more security function instances configured according to the security policy. The security policy is determined based on security requirements of the network slice instance.

The procedure 800 may further comprise checking whether the security policy is consistent with or conflict with a security policy of another network slice instance which is sharing the constituent network slice subnet instance, as shown at block 830. Alternatively or additionally, the procedure 800 may further comprise checking whether the security policy is consistent with or conflict with a security policy applied to another constituent network slice subnet instance of the same network slice instance. If the security policy is consistent with the security policy of another network slice instance or another constituent network slice subnet instance, it can be determined that the security function instance can be deployed.

In some embodiments, the procedure 800 can further comprise selecting a network slice subnet network resource module for the constituent network slice subnet instance based on the security policy. The network slice subnet network resource module defines one or more security functions. The request can a request for creating a new network slice subnet instance, or reusing an existing network slice subnet instance. In this example, the procedure 800 can further comprise causing to create a new network slice subnet instance or reuse an existing network slice subnet instance according to the selected NSS network resource module.

In some embodiments, the procedure 800 can further comprise monitoring the security function instance during an operation of the network slice instance; determining performance or capacity change of the security function instance; and scaling out or scaling in capacities of the security function instance according to the performance or capacity change.

In some embodiments, the procedure 800 can further comprise collecting security relevant data of the constituent network slice subnet instance during an operation of the network slice instance; and determining a security incident based on an analysis on the security relevant data. A new security policy can be determined according to the security incident, to configure the security function instance and/or a new security function instance. In some embodiments, a report or an alarm indicative of the security incident can be sent to a network slice layer, for example to trigger an update of one or more constituent network slice instances of the network slice instance.

Figure 9:
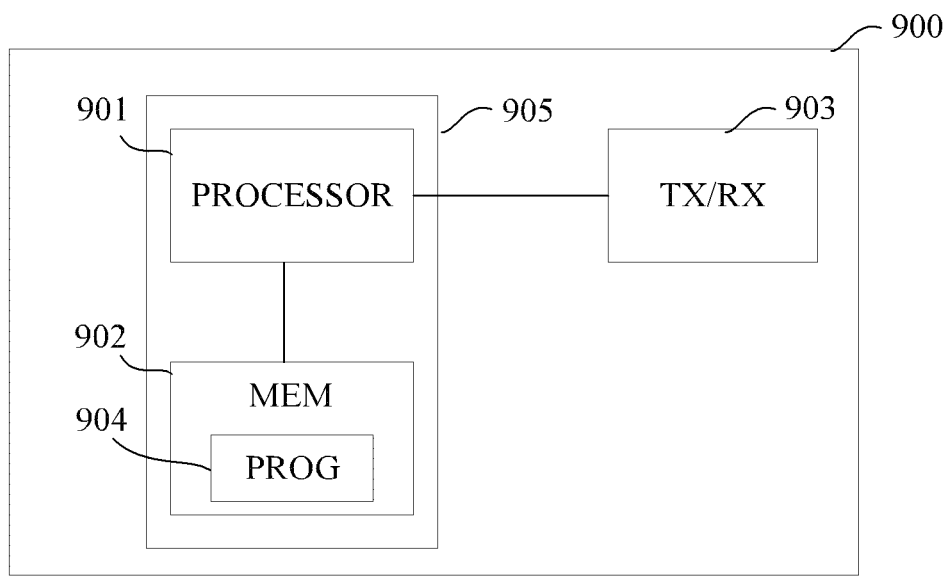
FIG. 9 shows a simplified block diagram of an apparatus according to an embodiment of the present disclosure.

FIG. 9 shows a simplified block diagram of an apparatus according to an embodiment of the present disclosure. As shown in FIG. 9, the apparatus 900 comprises a processor 904, a memory 905, and a transceiver 901 in operative communication with the processor 904. The transceiver 901 comprises at least one transmitter 902 and at least one receiver 903. While only one processor is illustrated in FIG. 9, the processor 904 may comprises a plurality of processors or multi-core processor(s). Additionally, the processor 904 may also comprise cache to facilitate processing operations. For some same or similar parts which have been described with respect to FIGS. 2, 3, 7 and 8, the description of these parts is omitted here for brevity.

Computer-executable instructions can be loaded in the memory 905 and, when executed by the processor 904, cause the apparatus 900 to implement the above-described methods.

Additionally, an aspect of the disclosure can make use of software running on a computing device. Such an implementation might employ, for example, a processor, a memory, and an input/output interface formed, for example, by a display and a keyboard. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, random access memory (RAM), read only memory (ROM), a fixed memory device (for example, hard drive), a removable memory device (for example, diskette), a flash memory and the like. The processor, memory, and input/output interface such as display and keyboard can be interconnected, for example, via bus as part of a data processing unit. Suitable interconnections, for example via bus, can also be provided to a network interface, such as a network card, which can be provided to interface with a computer network, and to a media interface, such as a diskette or CD-ROM drive, which can be provided to interface with media.

Accordingly, computer software including instructions or code for performing the methodologies of the disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

As noted, aspects of the disclosure may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a RAM, ROM, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Computer program code for carrying out operations for aspects of the disclosure may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

The flowchart and block diagrams in the figures illustrate the architecture, functionality, and operation of possible implementations of systems, methods and computer program products according to various embodiments of the disclosure. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially simultaneously, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In any case, it should be understood that the components illustrated in this disclosure may be implemented in various forms of hardware, software, or combinations thereof, for example, application specific integrated circuit(s) (ASICS), functional circuitry, an appropriately programmed general purpose digital computer with associated memory, and the like. Given the teachings of the disclosure provided herein, one of ordinary skill in the related art will be able to contemplate other implementations of the components of the disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises", "containing" and/or "comprising," when used in this specification, specify the presence of stated features, integers, steps, operations, elements, and/or components, but do not preclude the presence or addition of another feature, integer, step, operation, element, component, and/or group thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A method, implemented by at least one processing circuitry of a computing device, comprising:
   obtaining security requirements of a network slice instance;
   determining, based on the security requirements of the network slice instance, respective security policy to be applied to each of a plurality of constituent network slice subnet instances of the network slice instance;
   requesting corresponding network slice subnet management functions to create the plurality of constituent network slice subnet instances separately by:
      sending, to respective network slice subnet management functions of each network slice subnet domain of the plurality of constituent network slice subnet instances, a request to allocate network slice resources to create a network slice subnet instance that supports a corresponding security policy;
   for each of the plurality of the constituent network slice subnet instances:
      selecting, by the corresponding network slice subnet management functions, an appropriate network slice subnet network resource model based on the security requirements and corresponding security policies; and
      creating the network slice subnet instance to support the corresponding security policies;
   causing each of the plurality of constituent network slice subnet instances to be provided with one or more security function instances configured according to the respective determined security policy;
   sending corresponding requests to allocate the plurality of constituent network slice subnet instances for the network slice instance, wherein each of the corresponding requests contains the respective security policy of corresponding constituent network slice subnet instance;
   receiving a report or an alarm indicative of a security incident in one of the plurality of constituent network slice subnet instances;
   updating, based on the security incident, a security policy of at least one constituent network slice subnet instance of the plurality of constituent network slice subnet instances; and
   causing the at least one constituent network slice subnet instance to be updated, in order to be provided with a new security function instance or a reconfigured existing security function instance according to an updated security policy.

2. The method according to claim 1, further comprising:
   breaking down the security requirements of the network slice instance into separate security requirements corresponding to each of the plurality of constituent network slice subnet instances,
   wherein determining the respective security policy comprises: deriving the respective security policy based on the separate security requirements corresponding to each of the plurality of constituent network slice subnet instances.

3. The method according to claim 2, further comprising:
   receiving a request for allocating the network slice instance for a service; determining security requirements of the service; and
   determining the security requirements of the network slice instance according to the security requirements of the service.

4. The method according to claim 3, further comprising:
   selecting a network slice network resource module for the network slice instance based on the security requirements of the network slice instance, the network slice network resource module defines a plurality of constituent network slice subnets of the network slice instance.

5. The method according to claim 4, wherein the one or more security function instances comprise a security function instance which is to be deployed at an edge of respective network slice subnet instance.

6. The method according to claim 5, further comprising:
   sending a request to create a security network slice subnet instance at the edge of the network slice instance, wherein the request contains a security policy determined according to the security requirements of the network slice instance.

7. The method according to claim 6, wherein the one or more security function instances comprise a firewall.

8. The method according to claim 7, wherein the method is performed in a network slice layer.

9. An apparatus, comprising:
   at least one processor; and
   at least one memory including computer program code, the at least one memory and the computer program code configured to, with the at least one processor, cause the apparatus to:
      obtain security requirements of a network slice instance;
      determine, based on the security requirements of the network slice instance, respective security policy to be applied to each of a plurality of constituent network slice subnet instances of the network slice instance;
      request corresponding network slice subnet management functions to create the plurality of constituent network slice subnet instances separately by:
         sending, to respective network slice subnet management functions of each network slice subnet domain of the plurality of constituent network slice subnet instances, a request to allocate network slice resources to create a network slice subnet instance that supports a corresponding security policy;
      for each of the plurality of the constituent network slice subnet instances:
         select, by the corresponding network slice subnet management functions, an appropriate network slice subnet network resource model based on the security requirements and corresponding security policies; and create the network slice subnet instance to support the corresponding security policies;

cause each of the plurality of constituent network slice subnet instances to be provided with one or more security function instances configured according to the respective determined security policy;

send corresponding requests to allocate the plurality of constituent network slice subnet instances for the network slice instance, wherein each of the corresponding requests contains the respective security policy of corresponding constituent network slice subnet instance;

receive a report or an alarm indicative of a security incident in one of the plurality of constituent network slice subnet instances;

update, based on the security incident, a security policy of at least one constituent network slice subnet instance of the plurality of constituent network slice subnet instances; and cause the at least one constituent network slice subnet instance to be updated, in order to be provided with a new security function instance or a reconfigured existing security function instance according to an updated security policy.

10. The apparatus according to claim 9, wherein the at least one memory and the computer program code are configured to, with the at least one processor, further cause the apparatus to, break down the security requirements of the network slice instance into separate security requirements corresponding to each of the plurality of constituent network slice subnet instances, wherein the respective security policy is determined by deriving the respective security policy based on the separate security requirements corresponding to each of the plurality of constituent network slice subnet instances.

11. The apparatus according to claim 9, wherein the at least one memory and the computer program code are configured to, with the at least one processor, further cause the apparatus to, receive a request for allocating the network slice instance for a service;

determine security requirements of the service; and determine the security requirements of the network slice instance according to the security requirements of the service.

12. The apparatus according to claim 11, wherein the at least one memory and the computer program code are configured to, with the at least one processor, further cause the apparatus to, select a network slice network resource module for the network slice instance based on the security requirements of the network slice instance, the network slice network resource module defines a plurality of constituent network slice subnets of the network slice instance.

13. The apparatus according to claim 12, wherein the one or more security function instances comprise a security function instance which is to be deployed at an edge of respective network slice subnet instance.

14. The apparatus according to claim 13, wherein the at least one memory and the computer program code are configured to, with the at least one processor, further cause the apparatus to, send a request to create a security network slice subnet instance at the edge of the network slice instance, wherein the request contains a security policy determined according to the security requirements of the network slice instance.

15. The apparatus according to claim 14, wherein the security function instance comprises a firewall.

16. An apparatus, comprising:

at least one processor;

at least one memory including computer program code, the memory and the computer program code configured to, with the at least one processor, cause the apparatus to:

receive a request to allocate a constituent network slice subnet instance for a network slice instance, wherein the request contains a security policy to be applied to the constituent network slice subnet instance; and cause the constituent network slice subnet instance to be provided with one or more security function instances configured according to the security policy determined based on security requirements of the network slice instance, wherein the security policy is determined by, breaking down the security requirements of the network slice instance into separate security requirements corresponding to each of the constituent network slice subnet instance, and deriving a respective security policy based on the separate security requirements corresponding to each of the constituent network slice subnet instance;

collect security relevant data of the constituent network slice subnet instance during an operation of the network slice instance;

determine a security incident based on an analysis on the security relevant data; and determine a new security policy from the security incident, in order to configure a security function instance and/or to create one or more new security function instances, according to the new security policy;

send a report or an alarm indicative of the security incident to a network slice layer;

triggering an update of constituent network slice subnet instances of the network slice instance on the slice layer.

17. The apparatus according to claim 16, wherein the at least one memory and the computer program code are configured to, with the at least one processor, further cause the apparatus to, check whether the security policy is consistent with or conflict with a security policy of another network slice instance which is sharing the constituent network slice subnet instance.

18. The apparatus according to claim 17, wherein the at least one memory and the computer program code are configured to, with the at least one processor, further cause the apparatus to, check whether the security policy is consistent with or conflict with a security policy applied to another constituent network slice subnet instance of the same network slice instance.

19. The apparatus according to claim 18, wherein the at least one memory and the computer program code are configured to, with the at least one processor, further cause the apparatus to, select a network slice subnet network resource module for the constituent network slice subnet instance based on the security policy, the network slice subnet network resource module defines one or more security functions.

20. The apparatus according to claim 19, wherein the at least one memory and the computer program code are configured to, with the at least one processor, further cause the apparatus to, monitor the security function instance during the operation of the network slice instance;

determine performance or capacity change of the security function instance; and scale out or scale in capacities of the security function instance according to the performance or capacity change.

21. A non-transitory computer-readable storage medium, having instructions stored thereon which, when executed by at least one processor, cause the at least one processor to perform steps of:

obtaining security requirements of a network slice instance;

determining, based on the security requirements of the network slice instance, respective security policy to be applied to each of a plurality of constituent network slice subnet instances of the network slice instance;

requesting corresponding network slice subnet management functions to create the plurality of constituent network slice subnet instances separately by:

sending, to respective network slice subnet management functions of each network slice subnet domain of the plurality of constituent network slice subnet instances, a request to allocate network slice resources to create a network slice subnet instance that supports a corresponding security policy;

for each of the plurality of constituent network slice subnet instances:

selecting, by the corresponding network slice subnet management functions, an appropriate network slice subnet network resource model based on the security requirements and corresponding security policies; and creating the network slice subnet instance to support the corresponding security policies;

causing each of the plurality of constituent network slice subnet instances to be provided with one or more security function instances configured according to the respective determined security policy;

sending corresponding requests to allocate the plurality of constituent network slice subnet instances for the network slice instance, wherein each of the corresponding requests contains the respective security policy of corresponding constituent network slice subnet instance;

receiving a report or an alarm indicative of a security incident in one of the plurality of constituent network slice subnet instances;

updating, based on the security incident, a security policy of at least one constituent network slice subnet instance of the plurality of constituent network slice subnet instances; and causing the at least one constituent network slice subnet instance to be updated, in order to be provided with a new security function instance or a reconfigured existing security function instance according to an updated security policy.

* * * * *